United States Patent [19]

Le Berre et al.

[11] Patent Number: 5,748,732
[45] Date of Patent: May 5, 1998

[54] PAY TV METHOD AND DEVICE WHICH COMPRISE MASTER AND SLAVE DECODERS

[75] Inventors: Jacques Le Berre, Puteaux, France; Bjorn Persson, Motala, Sweden

[73] Assignee: U.S. Philips Corporation, New York, N.Y.

[21] Appl. No.: 605,335

[22] Filed: Feb. 8, 1996

[30] Foreign Application Priority Data

Feb. 8, 1995 [FR] France .................... 9501449

[51] Int. Cl.[6] .................... H04N 7/167; H04L 9/00
[52] U.S. Cl. .................... 380/10; 348/5.5; 380/20; 380/21
[58] Field of Search .................... 380/10, 20, 21, 380/25; 348/5.5, 8, 10

[56] References Cited

U.S. PATENT DOCUMENTS

| 4,484,027 | 11/1984 | Lee et al. ............ 380/21 |
|---|---|---|
| 4,633,309 | 12/1986 | Li et al. ............ 380/20 |
| 5,461,675 | 10/1995 | Diehl et al. ............ 380/23 |
| 5,509,073 | 4/1996 | Monnin ............ 380/20 |
| 5,563,948 | 10/1996 | Diehl et al. ............ 380/16 |

OTHER PUBLICATIONS

"Specification of the D2–MAC Packet System", Edition 1985, pp. 142, 143.

*Primary Examiner*—Thomas H. Tarcza
*Assistant Examiner*—Pinchus M. Laufer
*Attorney, Agent, or Firm*—Laurie E. Gathman

[57] ABSTRACT

A master decoder for use with a master smart card and at least one slave decoder for use with a slave smart card are arranged in a pay tv system, wherein the master decoder receives slave entitlement messages from a central management device and writes the slave entitlement messages to the slave smart cards when the slave smart cards are inserted in the master decoder. This ensures that the slave decoders are used within close proximity of the master decoders, such as in the same dwelling.

6 Claims, 1 Drawing Sheet

5,748,732

PAY TV METHOD AND DEVICE WHICH COMPRISE MASTER AND SLAVE DECODERS

BACKGROUND OF THE INVENTION

The invention relates to a pay-TV method based on the use at a user's place of a microprocessor card referred to as smart card to be inserted into a decoding/descrambling member referred to as decoder, in which method the smart card is used for storing, inter alia, data relating to the entitlements of the user, said entitlements being loaded over the air into each user smart card from a central management device which generates and transmits entitlement management messages.

The entitlements are understood to mean an assembly of data entitling a user to receive a given program.

The invention also relates to a television system comprising a transmitter and a plurality of receiver installations, one of which is conceived for receiving pay-TV broadcasts, and having at least a decoding/descrambling member referred to as decoder, provided with a reader for a microprocessor card referred to as smart card used for storing data relating to the entitlements of a user, the transmitter comprising a management device which generates and transmits entitlement management messages over the air.

The invention also relates to a television receiving apparatus provided with a reader for a microprocessor card referred to as smart card, in which the smart card is used for storing, inter alia, entitlement management messages transmitted by a transmitter and protected by a cryptographic means, which messages can only be exploited in association with the smart card for which they are intended and which contain, inter alia, an identification number of the receiving apparatus and data relating to the entitlements, the receiving apparatus being provided with means for starting a cryptographic process in association with the smart card when it receives such a message for authenticating and decrypting the entitlement management message and loading it into the smart card.

An entitlement control method corresponding to the method described in the opening paragraph is particularly known from the EUROCRYPT system. The standard concerning this system (specification of the D2-MAC packet system, edition 1985), pp. 142, 143 describes such an encryption process.

There will be a need for distributing several decoders with their associated smart cards to one and the same user. A second or a third decoder for one and the same user may be advantageous with regard to the costs of subscription for the second and possibly the third decoder for which he may obtain reductions.

It is clear that such a reduction can only be granted if the second and the third decoder are used in the same house or the same apartment. In principle, this decoder must not be given to parents or friends.

SUMMARY OF THE INVENTION

It is an object of the invention to provide a method and a system which renders the use of a slave decoder difficult if it is not used in the proximity of a master decoder.

In accordance with the inventive method:

a master decoder and at least one slave decoder are arranged at the receiver end, to be used in one and the same dwelling, the central management device supplies an entitlement management message which is intended for the master decoder and can be exploited only by the master decoder, this entitlement management message, which is protected by a cryptographic means, contains, inter alia, an identification number of the master decoder and data relating to the entitlements and comprising those of a slave decoder, the master decoder starts a cryptographic process in association with the smart card when it receives this message for authenticating and decrypting the entitlement management message, and the user then inserts a slave smart card into the master decoder and the master decoder writes the slave entitlements on said card.

The invention is thus based on the recognition that the master decoder is used as a letterbox for entitlement management messages intended for the slave smart card-slave decoder assemblies.

The entitlements intended for the slave decoder are preferably renewed more frequently than the entitlements intended for the master decoder, for example, those intended for the slave decoder may be renewed at least every week, whereas the entitlements intended for the master decoder are renewed every month.

Advantageously, a single entitlement management message intended for the master decoder may be used to update the entitlements of several slave decoders.

The management device thus supplies only one entitlement management message for several receivers, for which a small storage capacity (approximately 100 8-bit bytes) in the decoders is sufficient.

A pay-TV system according to the invention is characterized in that it comprises, in one and the same dwelling, a master decoder and at least one slave decoder intended for use in this same dwelling, the management device is provided with means for supplying an entitlement management message intended for the master decoder and protected by a cryptographic means, which message can be exploited only by the master decoder and which contains, inter alia, an identification number of the master decoder and data relating to the entitlements comprising those of a slave decoder, the master decoder is provided with means for starting a cryptographic process in association with the master smart card when it receives this message for authenticating and decrypting the entitlement management message and loading it into the master smart card, and means for writing the slave entitlements on a slave card when such a card is inserted into the master decoder.

A television receiving apparatus according to the invention is advantageously provided with means for writing the entitlements of another apparatus, said to be a slave apparatus into a slave smart card, when the entitlement management message contains entitlements of a slave apparatus associated with a slave smart card.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
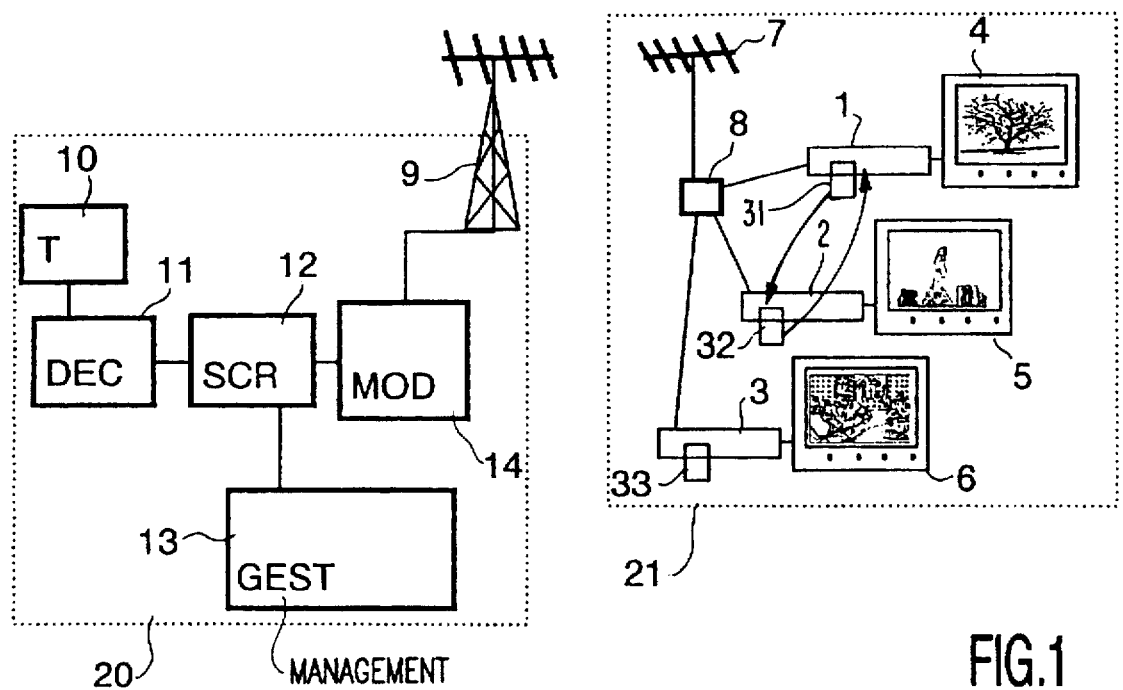
FIG. 1 shows diagrammatically a system according to the invention.

The system shown in FIG. 1 comprises a transmission centre or transmitter 20 and a quantity of receiver installations, one of which is shown at 21.

The transmission centre 20 comprises a picture and sound source 10, for example a television camera or a video recorder whose signal is coded for example in PAL, SECAM, NTSC, etc., or also in a compressed digital form in an encoder 11 and then scrambled in a scrambling unit 12 which also adds the scrambling data and the necessary cryptographic elements to the signal, supplying descrambling keys to the receivers in known manner. These scrambling data, which comprise, inter alia, the entitlements, are generated by a central entitlement management device 13.

The signal is finally RF modulated by a modulator 14 before it is transmitted by an antenna 9 which may also be a satellite antenna.

In a receiver installation 21, the signals are received by a receiver, here an antenna 7, which may also be a satellite receiver system or a collective antenna or a cable network.

A distributor 8 distributes the signal among three installations, for example arranged in three different rooms of one and the same dwelling and constituted by a television receiver 4 and a decoder 1 with a smart card 31, a television receiver 5 and a decoder 2 with a smart card 32, and a television receiver 6 and a decoder 3 with a smart card 33, respectively. Each decoder is connected to the corresponding television receiver, for example by means of a standard peripheral television connection allowing transfer of the useful signals between the television receiver and the decoder. One of the decoders, for example decoder number 1 is the master decoder and the two others are slave decoders.

Known, improved cryptographic and addressing mechanisms are used to ensure the correct transmission and reception of entitlements. A standard procedure, for example "EUROCRYPT" may be used. The entitlements are transferred in entitlement management messages which are referred to as EMM. The data contained in the entitlements are, inter alia, references relating to subscriptions, dates of validity, credit values, etc.

The users having more than one decoder and smart card assembly are registered in the management device 13. The master decoder and smart card assembly and the slave decoder and smart card assembly are thus identified in the management device: this device keeps track of all the decoder and smart card assemblies distributed among the users. When a first decoder and smart card assembly is supplied to a user, the smart card distribution key is registered as the master key. When a second and subsequently a third decoder and smart card assembly is supplied to the same user, at the same house address, the second distribution key and the third distribution key are registered as slave keys.

The management device supplies a message EMM, for example once a month, for renewing the master entitlements (a master entitlement is valid for one month). This message EMM is received over the air on the basis of the identification number of the decoder, i.e. the address of the card 31, and passed on to the card 31 by the decoder 1.

The management device transmits, for example once a week, a message EMM intended for the master decoder and containing, inter alia, the data which are necessary for each card 32 and 33 to renew the entitlements of these cards which are thus valid for one week only. The messages supplied by the management device can only be exploited by the master decoder: the slave entitlements are never transmitted directly from the management device to the slave decoder and smart card assembly and the address and data of authentification which they convey correspond to the master decoder. These messages EMM are stored in a local memory of the decoder 1.

There is no hardware difference between a master decoder or a master smart card and between a slave decoder or a slave smart card.

Figure 2:
FIG. 2 shows the contents of an entitlement management message.

The contents of the message EMM intended for the master decoder, shown in FIG. 2, contain several fields: the address "A.M" of the master decoder, a service reference "Service ref", a field of data for the master and slave entitlements "M/EMM", "SL1/EMM", . . . , "SLn/EMM", etc. and a cryptographic protection data "crypto-protection". The field of entitlements may as well be transmitted in clear text or be encrypted.

When it receives this message, the master decoder starts a known cryptographic process in association with the smart card for authenticating and receiving the messages EMM, and their decrypting if necessary.

Here, the user has three decoder-smart card assemblies in his house. Thus, there are three decoders 1, 2, 3 and three smart cards 31, 32, 33.

The card 31 attached to the decoder 1 is registered in the management device as the master card. The cards 32, 33 attached to the decoders 2, 3, respectively, are registered in the management device as slave cards.

One can have only one master message EMM for updating the entitlements of the two slave decoders. One may also have several messages, provided that each can be exclusively exploited by the master decoder which will retransmit these messages.

The system may also be simplified when all the slave cards for one and the same user are clones, with the same address, the same keys, etc. However, the slave cards may also be provided with different keys and addresses.

Once a week the user is obliged to enter the cards 32 and 33 physically into the master decoder 1 so as to update the entitlements of the slave cards.

The periods of validity mentioned above are of course purely indicative and any other period may be chosen.

Figure 3:
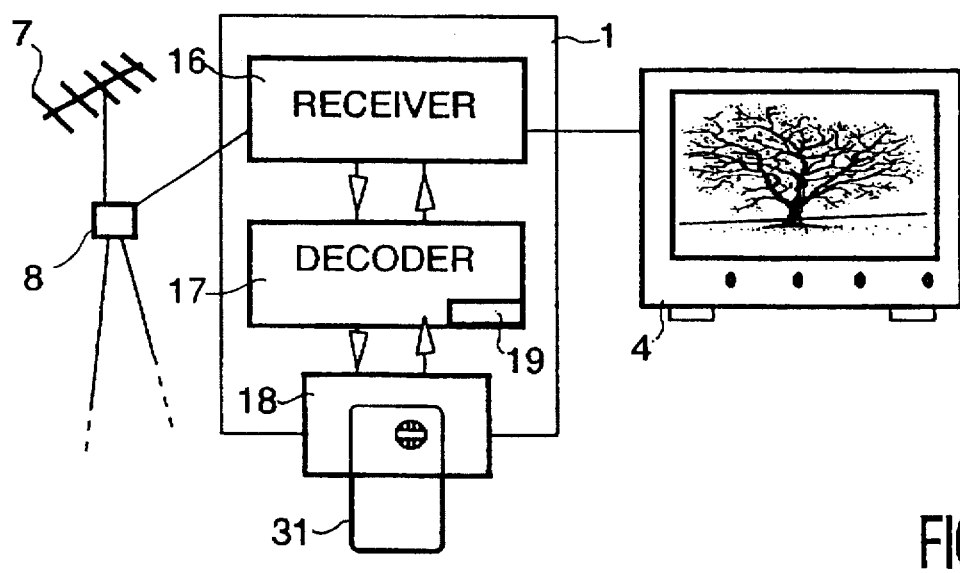
FIG. 3 shows diagrammatically a receiver installation with a master decoder.

The reception of the entitlements and decoding of the picture and sound signals are realised at the user's home by means of a decoder. A master decoder 1 is shown in greater detail in FIG. 3. It is provided with means 16 for receiving broadcasts, a decoding/descrambling module 17 and a reader 18 for the smart card 31.

The known means 16 for receiving broadcasts (tuner, frequency conversion, amplifier, demodulator) deliver the scrambled video and sound and data packets to the decoding/descrambling module 17. The module 17 returns the descrambled signals which are applied to the television receiver 4.

The module 17 returns certain digital data in known manner to the device with the smart card 18-31, notably control words extracted from said data packets, and the card supplies in return an initialization word which enables the decoder to descramble the video signals. The smart card comprises a cryptographic data referred to as distribution key intended for the user only and which allows decryption of the control words received in an encrypted form over the air by means of the above-mentioned improved known addressing and cryptographic mechanisms.

The decoder reads, from the messages EMM for this decoder, the entitlement management messages for the slave decoders. If they have been encrypted, it decrypts them by means of the distribution key from the card 31. It stores them in a memory 19 in which they can be reread so as to enter them on a slave card which the user inserts into the reader 18.

We claim:

1. A pay tv method, comprising the steps of:

arranging a master decoder and at least one slave decoder to be used with a slave smart card, where both decoders are located at a user's dwelling of a pay tv system, said master decoder for receiving an entitlement message from a central management device, said entitlement message containing data relating to the entitlements of a user which message can be exploited only by said master decoder and which message is protected by a cryptographic means and includes an identification code of the master decoder and data relating to the entitlements of at least one of said slave decoders;

decrypting and authenticating said entitlement message at the master decoder;

inserting the slave smart card into the master decoder; and writing the slave entitlements to the slave smart card.

2. A method as claimed in claim 1, wherein the entitlements intended for the at least one slave decoder are renewed more frequently than entitlements intended for the master decoder.

3. A method as claimed in claim 2, wherein the entitlements intended for the slave decoder are renewed at least once a week.

4. A method as claimed in claim 1, wherein there is an entitlement management message which is intended for the master decoder to update the entitlements of several slave decoders.

5. A pay tv system comprising:

a master decoder to be used with a master smart card and at least one slave decoder to be used with a slave smart card, where both decoders are located at a user's dwelling, the master decoder comprising a reader for reading smart cards which store data relating to the entitlements of a user;

a transmitter comprising a management device which generates and transmits entitlement management messages, at least one entitlement management message being intended for the master decoder and being encrypted such that it can be exploited only by the master decoder and which includes an identification code of the master decoder and data relating to the entitlements of the slave decoder; and wherein the master decoder further includes means for decrypting, in association with the master smart card, the entitlement management message intended for it and means for loading at least a portion of the entitlement management message into the master smart card, and means for writing the slave entitlements on the slave smart card when the slave smart card is inserted into the master decoder.

6. A television receiving apparatus comprising:

a reader for reading from a smart card entitlement messages transmitted by a transmitter and protected by a cryptographic means;

means for exploiting the message when the receiving apparatus is in association with the smart card for which the messages are intended;

means for receiving from the entitlement message identification code data and data relating to the entitlements;

means for starting a cryptographic process in association with the smart card when the television receiving apparatus receives such a message for authenticating and decrypting;

means for loading at least a portion of the message into the smart card;

means for reading from the message entitlements for another apparatus referred to as a slave apparatus and associated with another smart card referred to as a slave card; and means for writing the entitlements of the slave apparatus into the slave card.

* * * * *